Aug. 13, 1968 G. G. DUNBAR Re. 26,442

HOISTING FORK

Original Filed Sept. 30, 1964 3 Sheets-Sheet 1

INVENTOR.
Glenn G. Dunbar
BY
Freeman Crampton
ATTORNEY

HOISTING FORK

Original Filed Sept. 30, 1964 3 Sheets-Sheet 2

INVENTOR.
Glenn G. Dunbar
BY
ATTORNEY

HOISTING FORK

Original Filed Sept. 30, 1964 3 Sheets-Sheet 3

INVENTOR.
Glenn G. Dunbar
BY
ATTORNEY

United States Patent Office

Re. 26,442
Reissued Aug. 13, 1968

26,442
HOISTING FORK

Glenn G. Dunbar, Toledo, Ohio, assignor to The D & M Equipment Company, Toledo, Ohio, a corporation of Ohio Original No. 3,239,072, dated Mar. 8, 1966, Ser. No. 400,428, Sept. 30, 1964. Application for reissue Nov. 22, 1967, Ser. No. 689,740
4 Claims. (Cl. 294—67)

Matter enclosed in heavy brackets [ ] appears in the original patent but forms no part of this reissue specification; matter printed in italics indicates the additions made by reissue.

*ABSTRACT OF THE DISCLOSURE*

*A hoisting fork adapted for manipulation by a hoisting machine and having a hoisting machine connecting means that may be power actuated and controllably operable to advantageously vary the point of connection of the fork and hoisting machine and thereby the relation of the line of lift effort exerted by the hoisting machine through the hoisting fork with respect to the center of load mass to produce tilting of the fork favorable to loading, load carrying and load discharging.*

My invention has to do with material handling equipment, particularly for handling materials of considerable individual or assembled bulk in which, by that reason or by the lack of symmetry of the individual or assembled materials, the location of the center of mass of the material units or of the assembly thereof can not be easily or quickly determined.

The invention generally concerns and has for an object to provide a hoisting fork. More particularly, the invention concerns a hoisting fork adapted to be manipulated by a hoisting machine and particularly a means, forming a hoisting machine connecting part of such hoisting fork, that may be power actuated and controllably operable, as during hoisting, to advantageously move the point of connection of the hoisting fork with the hoisting machine with reference to the load engaging members of the hoisting fork. By this provision, the hoisting effort exerted by the hoisting machine through said connecting means may be applied relative to the center of mass of the hoisting fork and its engaged load as determined by the gravity action of the fork and load when lifted and along any line, such as preferably one that passes vertically through the center of mass of the load whereby an undesired tilting of the hoisting fork while carrying the load as would tend to discharge the load is prevented.

In consequence of the realization of the above mentioned object, an embodiment of my invention partakes of another and further advantage by which the connecting part means of the hoisting fork may be shifted relative to the hoisting fork load engaging elements and the center of mass of the hoisting fork to thus controllably tilt the hoisting fork, when lifted, and dispose the load engaging tine elements of the fork at a favorable angle to engage the load. For example, when the load comprises materials stacked on a pallet, the load engaging tine elements of the hoisting fork are best operated when directed under the pallet and between the pallet skids so that when the hoisting fork is raised the pallet and materials stacked thereon are bodily lifted. This can, by the use of embodiments of my invention, be accomplished.

Another advantage, coming as a consequence of the fulfillment of the general object of my invention outlined above, is that ease by which the hoisting fork may be caused to disengage a load, either discharge it in mid-air or disengaging it while at rest, at the unloading station.

For example, a mid-air discharge can be realized by moving the connecting part means of the hoisting fork relative to the center of mass of the load allowing the load to tilt and spill off the hoisting fork and over the open free ends of the load engaging tine elements thereof. Disengagement with a load at rest, such as a palletized load, may be also effected by lowering the hoisting fork and then, through a shift of the mentioned hoist connecting means relative to the center of mass of the unloading hoisting fork, the free end of the load engaging tine elements may be caused to dip and tail-out, as the hoisting fork is withdrawn from under the resting load bearing pallet.

A particular object of the invention in this last connection is to provide hydraulic power responsive elements for actuating the means to vary the connection between the hoisting fork and the hoisting machine. This provision lends itself to the advantage of utilizing the same kind and source of power utilized to actuate the hoisting machine and thus, in a combination therewith, may be operated by the hoisting machine operator from a single operator's station.

A further particular object of the invention is to provide an arrangement by which such connection varying means constitutes a structural part of the hoisting fork.

A still further particular object of the invention in this same connection is to provide a construction in which the power responsive elements of the means for varying the point of connection between hoisting machine and hoisting fork are enclosed by said means and are thus protected and housed by structural parts of the hoisting fork.

The invention has other and further objects, among which are those of providing the advantageous structures and arrangements which are described in the following description and appear from an examination of the accompanying drawings.

A hoisting fork containing my invention may take various forms, one of which now appears to me to be the best mode by which the teachings of my invention may be carried out. I shall describe that form and in doing so will make reference to the accompanying drawings. However, I do not imply, by such description and reference, that variation from such described or illustrated form is beyond the contemplation of any invention I make manifest herein.

Figure 1:
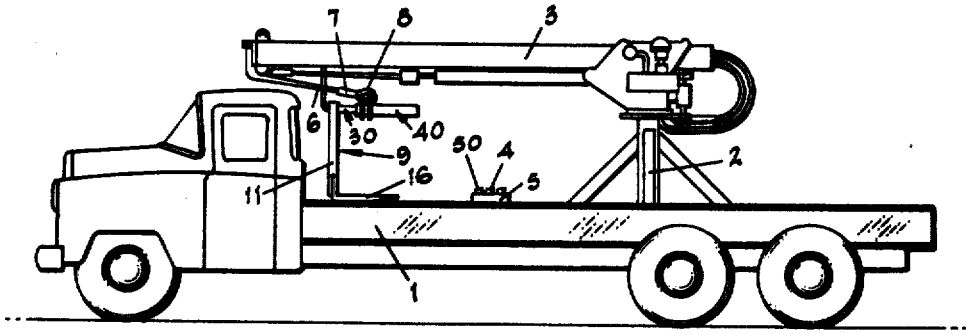
FIG. 1 is a view, in elevation, illustrating a hoisting fork embodying my invention, in association with a hoisting machine mounted for mobility on a truck vehicle.
Figure 2:
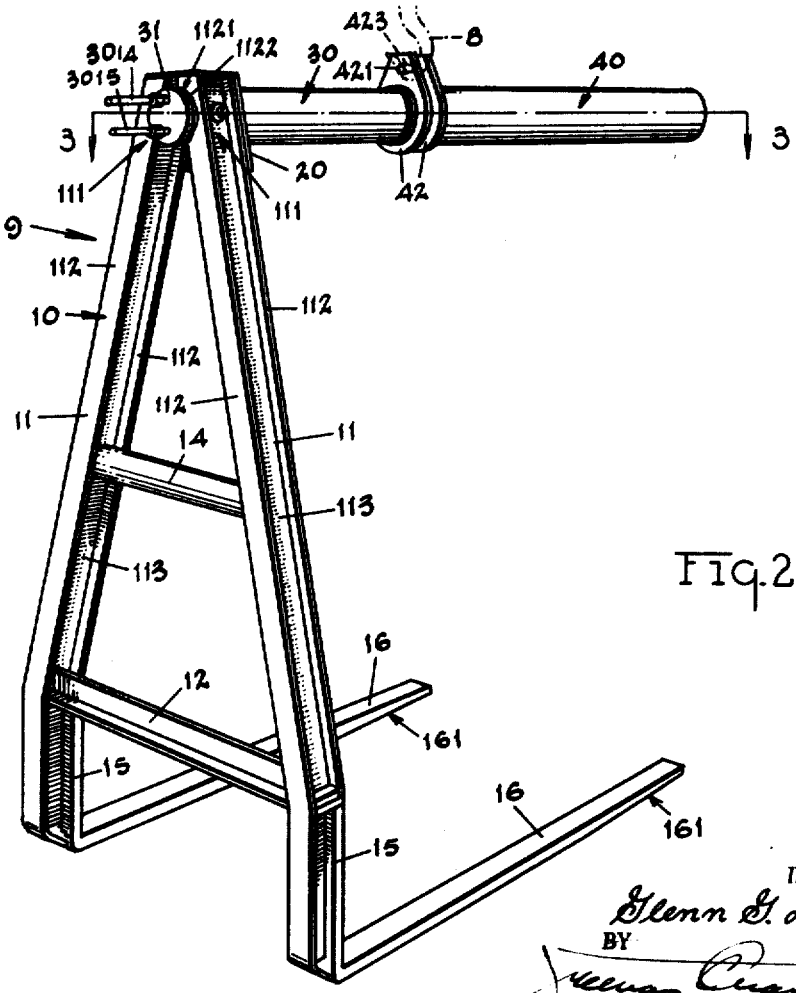
FIG. 2 is an enlarged perspective view of the hoisting fork shown in FIG. 1, suspended as by the hoisting machine of FIG. 1, in mid-air, without load.
Figure 3:
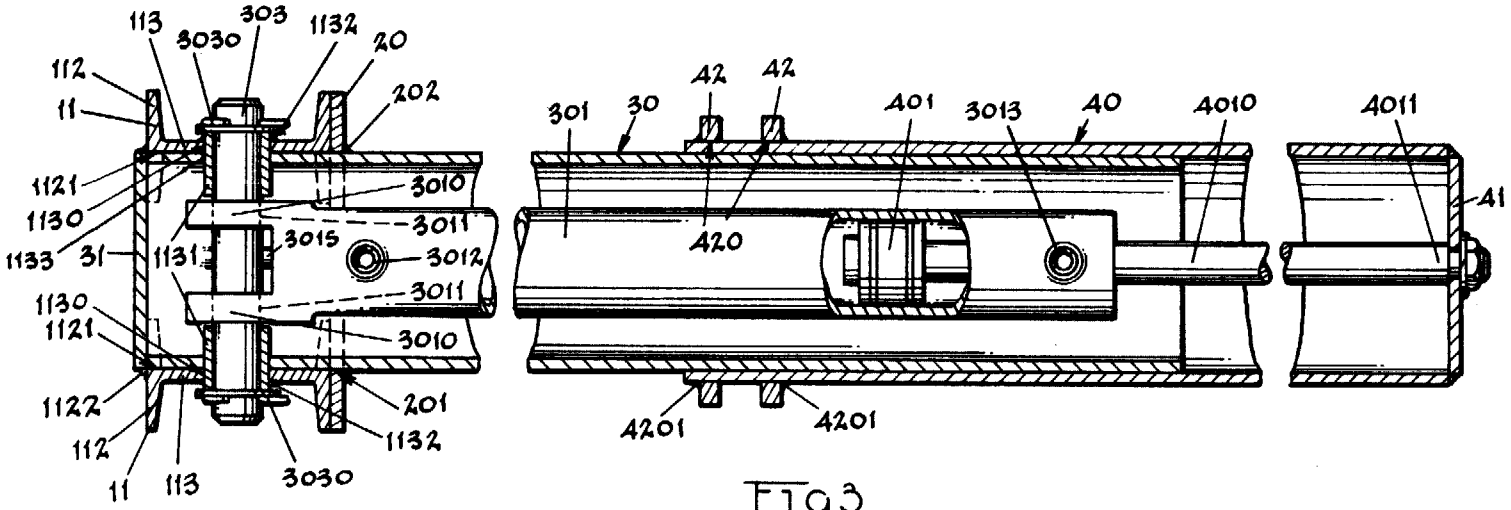
FIG. 3 illustrates a view of a broken enlarged longitudinal section taken along the plane of the line 3—3 indicated in FIG. 2.

An open stake bed truck, such as the vehicle 1 shown in FIG. 1 of the accompanying drawings, provides a mobile base for a hoisting machine like that shown in United States Letters Patent No. 3,093,248 to Winter. Such hoisting machine has a suitably braced short stub mast 2, upon and about which an extensible boom 3 may pivot as desired and directed. The extension of the boom 3 may be effected by suitable hydraulic means (not shown) activated through manipulation of controls 4 in the controller 5. The boom 3, by way of cables 6 that pass over a suitable sheave 7 to a conventional hook 8, connects with a hoisting fork 9 embodying the features of my invention.

The hoisting fork 9, chosen for purposes of illustrating my invention and shown in the accompanying drawing, has a frame 10, that, because of its shape, may be suitably called an A-frame. The frame has a pair of side rails 11 that may be I-beams held in inclined relation to each other, as by an end U-bar metal cross brace 12, that connect and may be welded to the spaced apart lower ends of the rails 11, and a medial tubular metal brace 14, extending between and connecting and welded to points on the side rails substantially half-way between the ends of each.

Each of the spaced apart lower ends of the side rails 11 has a depending leg 15 that may be also formed from I-beam stock and extends substantially vertically and parallel to each other. Each leg 15 has an end tine foot 16 that extends parallel to the other tine foot substantially horizontally and in a normal angular relation to the legs 15. The legs 15 and tine feet 16 comprise load engaging or cradling elements of a hoisting fork embodying my invention. If desired, the tine feet 16 may have upwardly tapering or skid ends 161 to facilitate movement of the hoisting fork 9 when moved to direct the tine feet 16 thereof endwise into or under a load or pallet supporting the same, an operation shown diagrammatically in FIG. 5 of the accompanying drawings.

The side rails 11, at their upper ends 111, form an apex and are there joined together by a suitable shroud or guesset plate 20, that may be fastened to one of the flanges 112 of each of the side rails 11. It is at this point that I propose to mount the means that my invention teaches and by which the hoisting fork 9 with its load engaging and cradling tine feet 16 and legs 15 is connected to the hoisting machine and may be manipulated by the hoisting machine operator, say from the controller 5.

Such means includes a pair of telescopically related and relatively movable tubular members 30 and 40, to which hydraulic actuating cylinder and piston components 301 and 401, respectively, disposed within the tubular members, are connected. The tubular member 30 is mounted upon the frame 10 to extend in normal angular relation to the plane of extension of the side rails 11 and thus substantially horizontally and parallel to the tine feet 16. Preferably, the member 30 has its end 31 extending through an opening 201 formed in the gusset plate 20 and between arcuate seats 1121 cut in all the facing flanges 112 of the ends 111 of the side rails 11. Here by suitable welding 202, between the member 30 and plate 20 and welding 1122 between flanges 112 and the member 30, a substantially rigid and rugged weldment of frame 10 and member 30 will be effected.

The member 40 encloses and slidably engages the member 30 and is axially movable along the same. Preferably, the member 40 has an end closing plate 41 to which one of the hydraulic actuating components, such as piston component 401, may be connected, as by piston rod 4010. The piston component 401 moves in the hydraulic cylinder component 301 in response to hydraulic pressure exerted therein.

The hydraulic cylinder 301 is preferably connected to the frame 10 against endwise movement but to allow slight pivotal adjusting compensatory movement, the need for which will be explained hereinafter. To accomplish this the cylinder 301, at the end thereof within the member 30 nearest the frame 10, has a bifurcated structure consisting of a pair of clevis arms 3010 in each of which a suitable journal 3011 is formed. The journals 3011 are coaxially aligned about a horizontally extending axis and adapted to receive and bear on an axle shaft 303 that extends through openings 1130 formed in webs 113 of the side rails 11 and through journals bearing sleeves 1131 fixed, as by welds 1132, to the webs 113 of the frame side rails. The sleeves 1131 not only provide the mentioned desired journals for the axle shaft 303 but also the inner ends of the sleeves 1131 act as thrust bearings tending, by engagement with clevis arms 3010 of the cylinder 301, to position and hold the cylinder substantially centrally of the member 30. Suitable washers and cotter pin assemblies 3030 on opposite ends of the shaft 303 conveniently serve to hold the shaft from an undesired endwise movement and at the same time provide a convenient disassembly arrangement.

Figure 4:
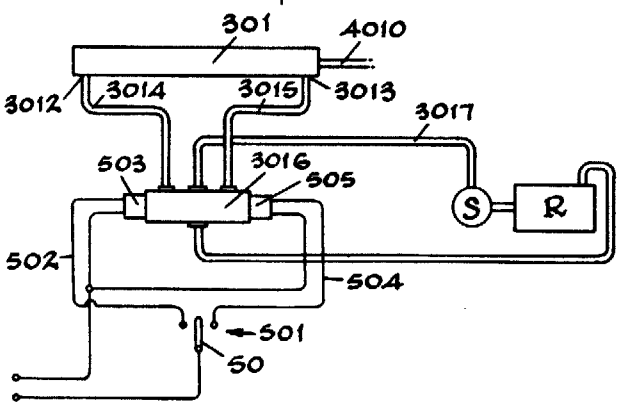
FIG. 4 is a diagram of a hydraulic system for use in conjunction with the hoisting fork shown in FIG. 1 and the related electric control circuit therefor.

The cylinder 301 may receive and discharge a hydraulic fluid, through openings 3012 and 3013 in the cylinder. Port 3012, as is shown in FIG. 4 of the accompanying drawings, is connected by pipe 3014 and port 3013 by pipe 3015 to a conventional four-way reversing, center biased valve 3016. The valve is in turn connected by line 3017 on one side to a source of fluid under pressure, such as pump S, and on the other to a sump R. The pump S and sump R may be that which also serve and receive hydraulic fluid for the hoisting machine boom operating means.

When the valve 3016 is actuated to connect the port 3013 with the pump S, the piston component 401 will be moved in a direction toward the frame 10, spent fluid being discharged to the sump R from the other cylinder port 3012. Contrariwise, when the valve 3016 is actuated to connect the port 3012, the piston component 401 will be moved in a direction away from the frame, spent fluid being discharged to the sump from the other cylinder port 3013.

The piston component 401 has a piston rod 4010 whose free end 4011 is suitably connected to the end closing plate 41 of the member 40. Thus, the movement of the piston component 401, as above described, will be transmitted to the member 40, causing the member 40 to move axially and telescopically along and over the member 30 in accordance with the operator's manipulation of the valve 3016. The manipulation of valve 3016 may be accomplished by electric controls similar to controls 4 and operated from the panel of controller 5. I show such an arrangement in FIG. 4 of the accompanying drawings. Control button 50 operates a three-position switch 501. One side of the switch 501 is in circuit 502 with solenoid coil 503, the energization of which moves the valve member in valve 3016 to connect port 3012 with the pump S and port 3013 with the sump R. The other side of the switch is in circuit 504 with solenoid coil 505, the energization of which moves *the* valve ['s 3012] member to connect port 3013 with the pump S and port 3012 with the sump R. When the control button is at its neutral position, neither of the mentioned solenoid circuits will be energized and valve 3016, responding to its bias, will center to block flow to or from either port 3012 and 3013 and connects pump with sump. With the valve 3016 in this center blocking position, the hydraulic fluid within the cylinder 301 and on opposite sides of the piston 401 will be entrapped, holding the piston and cylinder against any substantial relative movement. The advantages of this provision will soon be made apparent.

The member 40 mounts parts by which the hoisting machine hook 8 may be connected. As shown in the drawings, these parts may comprise a pair of spaced plates 42 that together with a suitable pin 423 form a yoke to be engaged by the hoisting machine hook. Each plate 42 has a large opening 420 and a small opening 421. The opening 420 is large enough to receive an end of the member 40 and thereby enclose the member end. By suitable welds 4201, each plate 42 is secured to the member 40 in a parallel spaced relation near the inner, open end of the member 40. The small openings 421 are thereby disposed in axial alignment to receive the pin 423, as it is passed through the openings 421.

It will now be apparent that the hoisting fork 9 described will be connected to the hoisting machine described in a manner by which the line of effort applied by cables 6 and exerted by the hoisting machine may be varied with reference to the center of mass of the hoisting fork and, if there be a load thereon, the load, through relative movement of the member 40 on the member 30. This, through the medium of the power elements 301 and 401, may be accomplished, either before the hoisting fork is in lifting strain on the load or during such strain. And, in addition, this can be effected without need of the hoisting machine operator exposing himself to the dangers of manually seizing the hoisting fork or its load in an attempt to make a desired adjustment.

Figure 5:
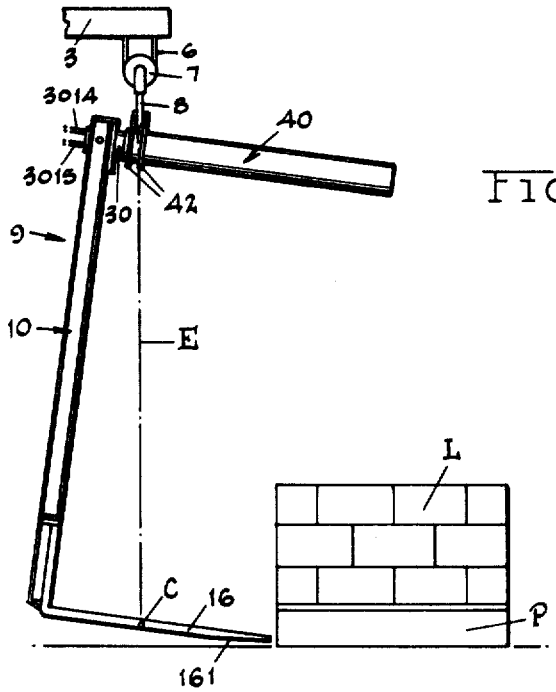
FIG. 5 is one of a series of diagrammatic illustrations of the hoisting fork showing its operational positions relative to a load and shows the same in pallet engaging and disengaging position.
Figure 6:
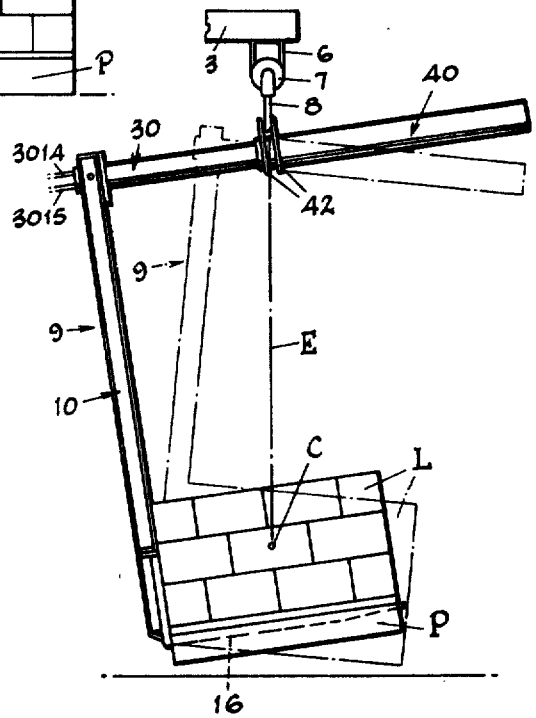
FIG. 6 is another of the series of diagrammatic illustrations of the hoisting fork shown in FIG. 2 and showing the same in another operational position of load lifting.
Figure 7:
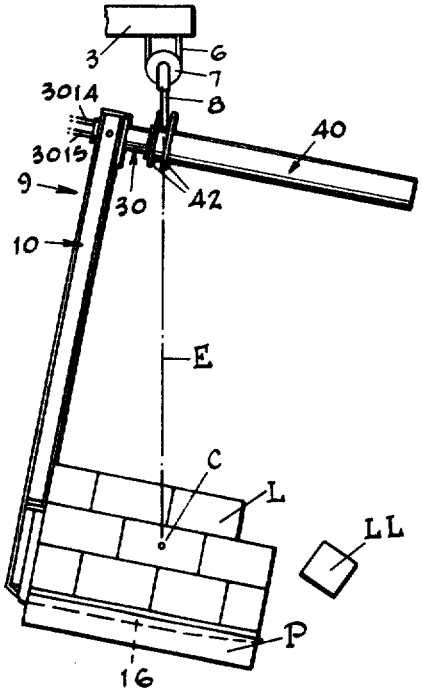
FIG. 7 is the last of the mentioned series of diagrammatic illustrations of the hoisting fork shown in FIG. 2 and shows the same in the operational position of load spilling or discharge.

As will be seen from viewing FIGS. 5, 6 and 7 of the accompanying drawings, the adjustment of the hoisting fork is made so that the line of lifting effort, there indicated diagrammatically E, acts with reference to the centers of mass, indicated C, on the particular load, whether such load be the empty hoisting fork 9, as illustrated in the diagram of FIG. 5 of the drawings, or a palletized load L as in diagrams FIGS. 6 and 7. This adjustment is made by moving the member 40 along member 30, through the means and in the manner described, to locate the yoke forming plates 42 at various desired distances from the frame 10.

Because the center of mass C of the unburdened hoisting fork 9 is near to the side rail 11 portions of the frame 10, it is necessary, if a trim to easily engage a palletized load L is to be had, to move the member 40 to a position locating the yoke forming plates 42 very close to the side rails 11 of the frame 10. This is shown in the diagram of FIG. 5 of the accompanying drawings. By so doing, it will be seen that the tine feet 16 are tilted to the horizontal and may now be skid on their tapered ends 161 under the pallet P supporting the palletized load L. Or, if it is desired to disengage the palletized load, as after a carry, like that shown in process in the diagram of FIG. 6, the operator tilting the fork 9, as shown in the diagram shown in FIG. 5, obtains an easy withdrawal of the tines 16 from under the pallet P.

As mentioned, the diagram of FIG. 6 shows the palletized load L being carried by the hoisting fork 9. To attain this trim, after having been in the position shown in the diagram of FIG. 5, the member 40 was moved outwardly on member 30. Since the center of mass C of the load L, in actual practice, is not marked or as easily ascertained, as the drawing diagrams of FIGS. 5, 6 and 7 may lead one to believe, the operator must locate it. He may do this by moving the member 40 along the member 30 and making a trial lift of the load L.

One such trial lift and the resultant undesirable trim of the load L is shown (somewhat exaggerated) in broken line portions of the diagram of FIG. 6. The operator seeing, in [trail] *trial* lift, that the load L is not canted properly into the fork 9 returns the load to ground and again moves the member 40 relative to the member 30 such as to position shown in full line in the diagram of FIG. 6. Now, when the lift is made, a cradling tilt to the fork 9, as shown, will be produced. The relation of the line of lifting effort E and center of mass C of the load is such [,] as is diagrammatically there illustrated.

In the diagram of FIG. 7, the action and relations are shown in a situation of directed load spilling, as to discharge the load, while suspended. This can be accomplished by moving member 40 slightly toward the frame 10 from its carry position of the diagram of FIG. 6 to produce a tilt of the hoisting fork 9 about the open ends of the tine feet 16. The palletized load L begins, as there shown, to discharge its components LL which fall to the ground.

In the use of the hydraulic elements 301 and 401 to move and hold the members 30 and 40, a high degree of incrementation of movement may be obtained and, when obtained, position may be held by the locked hydraulic circuits acting on the hydraulic elements 301 and 401. This is a material advantage over geared elements found in some prior art forms. This and the resultant simplicity, compactness and low cost are other advantages inherent in my structure.

I claim:

1. In combination with a hoisting fork comprising
a normally upright substantially vertically extending frame having
a plurality of spaced and substantially parallel and elongated tine feet extending substantially at an angle to the frame and laterally from the lower end thereof and adapted to engage a load to be lifted,
a hoist connecting beam comprising
a pair of sleeve elements in telescopic axially movable engagement with each other,
one of the sleeve elements being in engagement with and extending axially from the frame in substantially parallel relation to the tine feet to thus support the other sleeve element for axial movement along a line in parallel relation to the tine feet;
a hoist connector part in engagement with and on the mentioned other sleeve element;
a power actuatable means [within the sleeve elements and] in engagement [therewith] *with the sleeve elements*;
a source of power;
and a manually operable means in operative engagement with the source of power and the power actuatable means adapted, when operated, to connect the source of power to the power actuated means and thus to move the mentioned other sleeve element and hoist connector part along the length of the first mentioned sleeve element to locate the hoist connector part and thus the center of applied hoist lift effort in a desired reference to a vertical line extending through the center of mass of a load engaged by the tine feet.

2. In the hoisting fork hoist connecting beam described in claim 1 in which
the mentioned source of power is a hydraulic pump;
the mentioned power actuatable means comprise
a hydraulic cylinder in engagement with the frame and disposed within and extending substantially coaxially through said one of said pair of sleeve elements and
a hydraulic piston in engagement with the other of said pair of sleeve elements; and
the mentioned manually operable means includes a hydraulic valve operable to separately connect each end of the hydraulic cylinder to the source of power to thus alternately move the piston and the sleeve element connected thereto in one and the other directions and to entrap hydraulic medium within the cylinder to lock the piston and sleeve element connected thereto against movement.

3. In the hoisting fork hoist connecting beam described in claim 2 in which
the mentioned manually operable means includes
electrical circuits in operable engagement with the hydraulic valve and
a manually operable switch in operative engagement with the mentioned circuits for selectively making and breaking the mentioned circuits from a point remote from the hoisting fork.

4. In combination with
a source of power,
a hoisting machine and a hoist fork comprising a normally upright frame having a plurality of spaced and substantially parallel elongated tine feet extending substantially normal to the frame from the lower end thereof and adapted to engage with a load to be lifted, a hoist connecting beam comprising a pair of sleeve elements in telescopic relation and axially movable engagement with each other, one of the sleeve elements being in engagement with and extending axially from the frame in substantially parallel relation to the tine feet to thus support the other sleeve element for axial movement along a line in parallel relation to the tine feet;

a hoist connector part of the mentioned other sleeve element and in engagement with the hoisting machine;

power actuatable means within one of the sleeve elements and in engagement with both sleeve elements;

an operator station; and a manually operable means at the operator station operatively connected to the source of power and to the power actuatable means whereby operation of the mentioned manually operable means directs power from the source thereof to the power actuatable means to move the mentioned other sleeve element and hoist connector part along the length of the first mentioned sleeve element to locate the hoist connector part and center of applied hoist lift effort in some desired reference to a vertical line extending through the center of mass of the load engaged by the hoist fork tine feet.

References Cited

The following references, cited by the Examiner, are of record in the patented file of this patent or the original patent.

UNITED STATES PATENTS

| | | | |
|---|---|---|---|
| 2,495,658 | 1/1950 | Moseley | 294—67 |
| 2,514,307 | 7/1950 | Boyd | 294—82 |
| 2,690,926 | 10/1954 | Betz | 294—82 |
| 2,918,322 | 12/1959 | Bopp et al. | 294—67 X |
| 3,039,810 | 6/1962 | Bellingher et al. | 294—67 X |
| 3,093,248 | 6/1963 | Winter | 212—55 |

FOREIGN PATENTS

| | | |
|---|---|---|
| 946,607 | 8/1956 | Germany. |

EVON C. BLUNK, *Primary Examiner.*

H. C. HORNSBY, *Assistant Examiner.*